US008275485B2

(12) United States Patent
Schweitzer, III et al.

(10) Patent No.: US 8,275,485 B2
(45) Date of Patent: *Sep. 25, 2012

(54) ELECTRIC POWER SYSTEM AUTOMATION USING TIME COORDINATED INSTRUCTIONS

(75) Inventors: Edmund O. Schweitzer, III, Pullman, WA (US); David E. Whitehead, Pullman, WA (US); Gregory C. Zweigle, Pullman, WA (US); Normann Fischer, Colfax, WA (US); Robert E. Morris, Viola, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/854,072

(22) Filed: Aug. 10, 2010

(65) Prior Publication Data

US 2011/0035076 A1   Feb. 10, 2011

Related U.S. Application Data

(60) Provisional application No. 61/232,507, filed on Aug. 1, 2009.

(51) Int. Cl.
    *G06F 19/00* (2011.01)
(52) U.S. Cl. .......................... 700/286; 700/295
(58) Field of Classification Search .................. 700/286, 700/293, 295, 297; 702/61–64, 182–185, 702/57, 60; 342/500; 707/100; 340/870
See application file for complete search history.

(56) References Cited

U.S. PATENT DOCUMENTS

| 5,160,926 | A  |   | 11/1992 | Schweitzer |
| 5,680,324 | A  | * | 10/1997 | Schweitzer et al. .......... 370/241 |
| 5,793,750 | A  |   | 8/1998  | Schweitzer |
| 6,380,949 | B2 |   | 4/2002  | Thomas |
| 6,662,124 | B2 | * | 12/2003 | Schweitzer et al. ............ 702/65 |
| 6,757,282 | B1 |   | 6/2004  | Ofek |

(Continued)

OTHER PUBLICATIONS

On and control of power System, IEEE Power System Managment, 2005, p. 47-55.*

(Continued)

*Primary Examiner* — Kidest Bahta
(74) *Attorney, Agent, or Firm* — Jared L. Cherry

(57) ABSTRACT

A system for controlling and automating an electric power delivery system by executing time coordinated instruction sets to achieve a desired result. A communication master may implement the execution of time coordinated instruction sets in a variety of circumstances. The communication may be embodied as an automation controller in communication with intelligent electronic devices (IEDs). The communication master may also be embodied as an IED that is configured to coordinate the actions of other IEDs. The time coordinated instruction sets may include steps for checking status of power system equipment before executing. The time coordinated instruction sets may include reactionary steps to execute if one of the steps fails. The time coordinated instruction sets may also be implemented based on a condition detected in the electric power delivery system, or may be implemented through high level systems, such as a SCADA system or a wide area control and situational awareness system.

27 Claims, 10 Drawing Sheets

U.S. PATENT DOCUMENTS

| | | | |
|---|---|---|---|
| 6,871,224 B1 | 3/2005 | Chu | |
| 6,947,269 B2 | 9/2005 | Lee | |
| 6,957,158 B1* | 10/2005 | Hancock et al. | 702/61 |
| 6,961,641 B1 | 11/2005 | Forth | |
| 6,990,395 B2* | 1/2006 | Ransom et al. | 700/295 |
| 7,080,142 B2 | 7/2006 | Galloway | |
| 7,174,258 B2* | 2/2007 | Hart | 702/57 |
| 7,231,003 B2 | 6/2007 | Lee | |
| 7,415,368 B2* | 8/2008 | Gilbert et al. | 702/61 |
| 7,460,347 B2 | 12/2008 | Schweitzer | |
| 7,460,590 B2 | 12/2008 | Lee | |
| 7,463,467 B2 | 12/2008 | Lee | |
| 7,693,607 B2* | 4/2010 | Kasztenny et al. | 700/286 |
| 7,899,619 B2* | 3/2011 | Petras | 701/484 |
| 2001/0022734 A1* | 9/2001 | Sato | 363/21.08 |
| 2002/0173927 A1* | 11/2002 | Vandiver | 702/122 |
| 2004/0138834 A1* | 7/2004 | Blackett et al. | 702/62 |
| 2004/0138835 A1* | 7/2004 | Ransom et al. | 702/62 |
| 2004/0193329 A1* | 9/2004 | Ransom et al. | 700/286 |
| 2005/0138111 A1 | 6/2005 | Aton | |
| 2005/0138432 A1 | 6/2005 | Ransom | |
| 2005/0144437 A1* | 6/2005 | Ransom et al. | 713/151 |
| 2005/0280965 A1 | 12/2005 | Lee | |
| 2006/0155908 A1 | 7/2006 | Rotvold | |
| 2006/0230394 A1* | 10/2006 | Forth et al. | 717/168 |
| 2007/0133724 A1 | 6/2007 | Mazereeuw | |
| 2008/0052435 A1 | 2/2008 | Norwood | |
| 2008/0075019 A1 | 3/2008 | Petras | |
| 2008/0162930 A1 | 7/2008 | Finney | |
| 2009/0254655 A1 | 10/2009 | Kidwell | |

OTHER PUBLICATIONS

The electric Power grid. Power and energe Magazin, IEEE,Issue Data p. 445-450.*
John C. Eidson, IEEE-1588 standard for a Precision Clock Synchronization Protocal for Networked Measurment and Control Systems and Applications to the Power Industry, 2003, Agilnt Technologies, Inc. pp. 1-13.*
PCT/US2010/045086, Patent Cooperation Treaty, International Search Report and Written Opinion of the International Searching Authority, Oct. 8, 2010.
Wobshal, Network Sensors for the Smart Grid, Sensors Expo, 2010.
Carl B. Hauser, David E. Bakken, Anjan Bose, A Failure to Communicate, IEEE Power and Energy Magazine, Mar./Apr. 2005.
W.J. Ackerman, The Impact of IEDs on the Design of Systems Used for Operation and Control of Power Systems, Power System Management and Control, Apr. 17-19, 2002.
M. Kezunovic, G. Latisko, Automated Monitoring Functions for Improved Power System Operation and Control, IEEE, 2005.
ScadaWorks, SCADA System Development Tools, Technical Reference Manual, 2003.
Edmund O. Schweitzer, III, David E. Whitehead, Real-World Synchrophasor Solutions, Sep. 17, 2008.
Edmund O. Schweitzer, III, David E. Whitehead, Real-Time Power System Control Using Synchrophasors, Sep. 11, 2007.

* cited by examiner

| 1000 | Condition Triggering Execution 1006 | Instruction 1007 | Time 1009 |
|---|---|---|---|
| 1001 | $V \leq THRESHOLD_1$ | I1 | $T_0$ |
| 1002 | $T = T_0 + t_1$ | I2 | $T_0 + t_1$ |
| 1004 | If $V \leq THRESHOLD_2$ else If $V \geq THRESHOLD_2$ | I4 | $T_0 + t_3$ |
| | | I5 | $T_0 + t_4$ |
| 1005 | $T = T_0 + t_5$ | I6 | $T_0 + t_5$ |

ELECTRIC POWER SYSTEM AUTOMATION USING TIME COORDINATED INSTRUCTIONS

RELATED APPLICATIONS

The present application claims the benefit under 35 U.S.C. §119(e) of U.S. Provisional Patent Application No. 61/232,507 filed Aug. 10, 2009 titled "ELECTRIC POWER SYSTEM AUTOMATION USING PREDETERMINED INSTRUCTIONS," which application is incorporated herein by reference in its entirety.

TECHNICAL FIELD

This disclosure relates to automation and control of electric power transmission and distribution (delivery) systems. More particularly, this disclosure relates to automation and control using communication of time coordinated instruction sets based on the electric power delivery system configuration.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
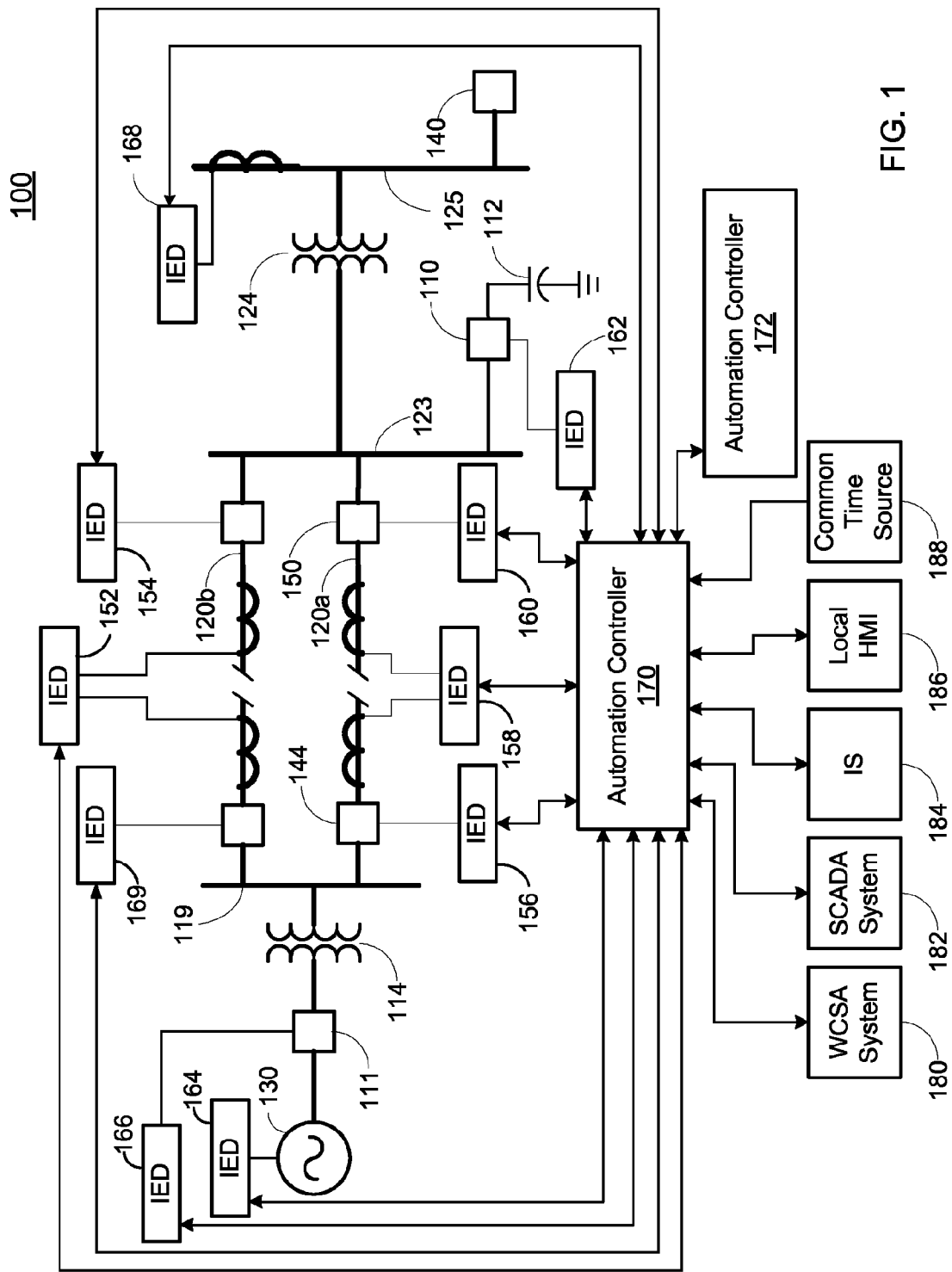
FIG. 1 illustrates a simplified one line diagram of an electric power delivery system.

Disclosed herein are systems and methods for automating an electric power delivery system using time coordinated instruction sets. The systems and methods disclosed herein may be utilized in a variety of circumstances for monitoring and controlling an electric power system. Utilities and other entities that operate electric power delivery systems may need to modify (temporarily or permanently) the configuration of the electric power transmission and delivery system or control the operation of the transmission and delivery system. Such modifications and control may occur due to equipment failure, equipment repair or replacement, system testing, change in load needs, change in available generation, shedding a particular generator and/or load, balancing reactive power in a particular region, and connecting a particular generation source in the event that a certain type of electric power is available or requested.

In certain embodiments, for example, operator actions may be necessary to maximize use of renewable-type generation. In response, devices may be configured to adjust the electric power system configuration by dropping coal-based generation, or other non-renewable-type generation, from as many loads as possible, adding renewable-type generation to make up for the lost generation, and balancing reactive power to the affected loads. In the case of balancing reactive power, the actions may include steps to retrieve VARS information from certain IEDs, switch certain capacitor banks on or off under certain conditions, and retrieve new VARS information from the IEDS to verify that the reactive power has been balanced across the region. In another example, operator actions may be developed for a parallel transformer arrangement for opening a tie breaker. In addition to these specific examples, operator actions may be developed for any situation involving adjustments or modifications to an electric power delivery system.

Electric power systems according to the present disclosure may coordinate actions in order to minimize disruption to certain characteristics of the electric power system. In certain embodiments, for example, an automation controller may coordinate the action of a plurality of connected devices by specifying in advance a specific time for each device to take a specific action. When the specified time comes, each device may execute the specified actions in a time coordinated manner. In this way, disruptions to the electrical power system may be reduced.

In various embodiments, the execution of specified actions at a specified time instant is facilitated by the distribution of a common time signal. A wide variety of types of time signals are contemplated, including an Inter-Range Instrumentation Group (IRIG) protocol, a protocol based on the global positioning system (GPS), a radio broadcast such as a National Institute of Science and Technology (NIST) broadcast (e.g., radio stations WWV, WWVB, and WWVH), the IEEE 1588 protocol, a network time protocol (NTP) codified in RFC 1305, a simple network time protocol (SNTP) in RFC 2030, and/or another time transmission protocol or system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device that is operable in conjunction with appropriate hardware to implement the programmed instructions. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable storage medium having stored thereon instructions that may be used to program a computer (or other electronic device) to perform processes described herein. The machine-readable storage medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified one line diagram of an electric power delivery system 100. Electric power delivery system 100 includes, among other things, a generator 130, configured to generate a sinusoidal waveform. Although illustrated as a one-line diagram, electric power delivery system 100 may represent a three phase power system. FIG. 1 illustrates a single phase system for simplicity.

A step-up power transformer 114 may be configured to increase the generated waveform to a higher voltage sinusoidal waveform. A bus 119 may distribute the higher voltage sinusoidal waveform to transmission lines 120a and 120b, which in turn connect to bus 123. Breakers 144, 150, 110, and 111, may be configured to be selectively actuated to reconfigure electric power delivery system 100. A step-down power transformer 124 may be configured to transform the higher voltage sinusoidal waveform to lower voltage sinusoidal waveform that is suitable for delivery to a load 140.

IEDs 152-169, shown in FIG. 1, may be configured to control, monitor, protect, and/or automate the electric power system 100. As used herein, an IED may refer to any microprocessor-based device that monitors, controls, automates, and/or protects monitored equipment within an electric power system. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, motor drives, and the like. IEDs gather status information from one or more pieces of monitored equipment. IEDs may receive information concerning monitored equipment using sensors, transducers, actuators, and the like.

IEDs 152-169 may also gather and transmit information gathered about monitored equipment. Although FIG. 1 shows separate IEDs monitoring a signal (e.g. 158) and controlling a breaker (e.g. 160) these capabilities may be combined into a single IED. FIG. 1 shows various IEDs performing various functions for illustrative purposes and does not imply any specific arrangements or functions required of any particular IED. IEDs may be configured to monitor and communicate information, such as voltages, currents, equipment status, temperature, frequency, pressure, density, infrared absorption, radio-frequency information, partial pressures, viscosity, speed, rotational velocity, mass, switch status, valve status, circuit breaker status, tap status, meter readings, and the like. IEDs may also be configured to communicate calculations, such as phasors (which may or may not be synchronized as synchrophasors), events, fault distances, differentials, impedances, reactances, frequency, and the like. IEDs may also communicate settings information, IED identification information, communications information, status information, alarm information, and the like. Information of the types listed above, or more generally, information about the status of monitored equipment is referred to as monitored system data.

IEDs 152-169 may also issue control instructions to the monitored equipment in order to control various aspects relating to the monitored equipment. For example, an IED may be in communication with a circuit breaker, and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Other examples of control instructions that may be implemented using IEDs may be known to one having skill in the art, but are not listed here. Information of the types listed above, or more generally, information or instructions directing an IED or other device to perform a certain action is referred to as control instructions.

IEDs 152-169 may be linked together using a data communications network, and may further be linked to a central monitoring system, such as a supervisory control and data acquisition ("SCADA") system 182, an information system 184, or a wide area control and situational awareness (WCSA) system 180. The embodiment of FIG. 1 illustrates a star topology having automation controller 170 at its center, however, other topologies are also contemplated. For example the IEDs 152-169 may be connected directly to the SCADA system 182 or the WCSA system 180. The data communications network of FIG. 1 may include a variety of network technologies, and may comprise network devices such as modems, routers, firewalls, virtual private network servers, and the like. IEDs and other network devices are connected to the communications network through a network communications interface.

IEDs 152-169 are connected at various points to electric power delivery system 100. IED 152 may be configured to monitor conditions on transmission line 120b, while IED 158 may monitor conditions on transmission line 120a. IEDs 154, 156, 160, and 169 may be configured to issue control instructions to associated breakers. IED 168 may monitor conditions on bus 125. IED 164 may monitor and issue control instructions to generator 130, while IED 166 may issue control instructions to breaker 111.

In certain embodiments, including the embodiment illustrated in FIG. 1, communication among various IEDs and/or higher level systems (e.g., SCADA system 182 or IS 184) may be facilitated by automation controller 170. Automation controller 170 may also be referred to as a central IED or access controller. In various embodiments, automation controller 170 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. Nos. 5,680,324, 7,630,863, and U.S. Patent Application Publication No. 2009/0254655, the entireties of which are incorporated herein by reference.

Centralizing communications in electric power delivery system 100 using automation controller 170 may provide the ability to manage a wide variety of IEDs in a consistent manner. Automation controller 170 may be capable of communicating with IEDs of various types and using various communications protocols. Automation controller 170 may provide a common management interface for managing connected IEDs, thus allowing greater uniformity and ease of administration in dealing with a wide variety of equipment. It should be noted that although an automation controller 170 is used in this example, any device capable of storing time coordinated instruction sets and executing such may be used in place of automation controller 170. For example, an IED, programmable logic controller, computer, or the like may be used. Any such device is referred to herein as a communication master.

In various embodiments, devices with electric power delivery system 100 may be configured to operate in a peer-to-peer configuration. In such embodiments, the communication master may be selected from among the available peer devices. Further, the device designated as the communications master may be changed. Such changes may occur as a result of losing communication with a device previously selected as a communications master, as a result of a change in the configuration of electric power delivery system 100, the detection of a specific condition triggering time coordinated action by an IED that is not designated as the communication master at the time of the occurrence of the condition, or under other circumstances.

IEDs 152-169 may communicate information to automation controller 170 including, but not limited to status and control information about the individual IEDs, IED settings information, calculations made by individual IEDs, event (fault) reports, communications network information, network security events, and the like. Automation controller 170, may be in communication with a second automation controller 172, in order to increase the number of connections to pieces of monitored equipment or to extend communication to other electric power delivery systems. In alternative embodiments, automation controller 170 may be directly connected to one or more pieces of monitored equipment (e.g., generator 130 or breakers 111, 144, 150, 110).

Automation controller 170 may also include a local human machine interface (HMI) 186. Local HMI 186 may be located at the same substation as automation controller 170. Local HMI 186 may be used to change settings, issue control instructions, retrieve an event (fault) report, retrieve data, and the like. In this structure, the automation controller 170 may include a programmable logic controller accessible using the HMI 186. A user may use the programmable logic controller to design and name time coordinated instruction sets that may be executed using the HMI 186. The time coordinated instruction sets may be stored in computer-readable storage medium (not shown) on automation controller 170.

The time coordinated instruction set may be developed outside automation controller 170 (e.g., using WCSA System, or SCADA System) and transferred to the automation controller or through the automation controller to the IEDs or, in another embodiment without the automation controller, directly to the IEDs, using a communications network, using a USB drive, or otherwise. For example, time coordinated instruction sets may be designed and transmitted via WCSA system 180. Further, it is contemplated that the automation controller or IEDs may be provided from the manufacturer with pre-set time coordinated instruction sets. U.S. patent application Ser. No. 11/089,818 (U.S. Patent Application Publication Number 2006/0218360) titled Method and Apparatus for Customization, naming Robert Morris, Andrew Miller, and Jeffrey Hawbaker as inventors, describes such a method, and is hereby incorporated by reference in its entirety.

Automation controller 170 may also be connected to a common time source 188. In certain embodiments, automation controller 170 may generate a common time signal based on common time source 188 that may be distributed to connected IEDs 152-169. Based on the common time signal, various IEDs may be configured to collect time-aligned data points, including synchrophasors, and to implement control instructions in a time coordinated manner. WCSA system 180 may receive and process the time-aligned data, and may coordinate time synchronized control actions at the highest level of the power system. In another embodiment, automation controller 170 may not receive a common time signal, but a common time signal may be distributed to to IEDs 156-168.

Common time source 188 may also be used by automation controller 170 for time stamping information and data. Time synchronization may be helpful for data organization, real-time decision-making, as well as post-event analysis. Time synchronization may further be applied to network communications. Common time source 188 may be any time source that is an acceptable form of time synchronization, including but not limited to a voltage controlled temperature compensated crystal oscillator, Rubidium and Cesium oscillators with or without a digital phase locked loops, MEMs technology, which transfers the resonant circuits from the electronic to the mechanical domains, or a GPS receiver with time decoding.

In the absence of a discrete common time source, automation controller 170 may serve as the time source by distributing a time synchronization signal (received from one of the sources described).

The electric power delivery system 100 in FIG. 1 illustrates redundancy in the transmission of electric power between bus 119 and bus 123 using transmission lines 120a and 120b. For a variety of reasons, the utility or entity operating electric power delivery system 100 may desire to take transmission line 120a out of service, thus requiring transmission line 120b to carry all of the electric power required for the loads connected to bus 123.

Increasing the electrical power transmitted on transmission line 120b has certain consequences. Due to increased current and increased impedance in transmission line 120b resulting from increased power transmission, the voltage at bus 123 and bus 125 will drop. These changes will further affect the real power and reactive power that are delivered over transmission line 120b. In order to maintain voltage and reactive power within certain limits for safe and reliable power distribution, voltage regulators in electric power delivery system 100 may make tap position changes. Further, IED 162 may issue a control instruction to breaker 110 to selectively connect a capacitor bank 112 to maintain a proper balance of reactive power.

Thus, removing transmission line 120a from service, while maintaining safe and reliable electric power delivery to load 140, requires more than simply issuing control instructions via IEDs 156 and 160 to open circuit breakers 144 and 150, respectively. Once circuit breakers 144 and 150 are opened, IEDs 152 and 162 may monitor voltages, currents, real power, and reactive power on transmission line 120b and bus 125, respectively, to balance the electric power that is ultimately delivered. Further, the operation of the voltage regulators and capacitor banks may affect the power system conditions, necessitating further tap changes of voltage regulators or switching on or off of capacitor banks. Such shifting and balancing of electric power delivery system 100 causes wear and tear on the equipment and sags and swells in power delivered to load 140.

Figure 2:
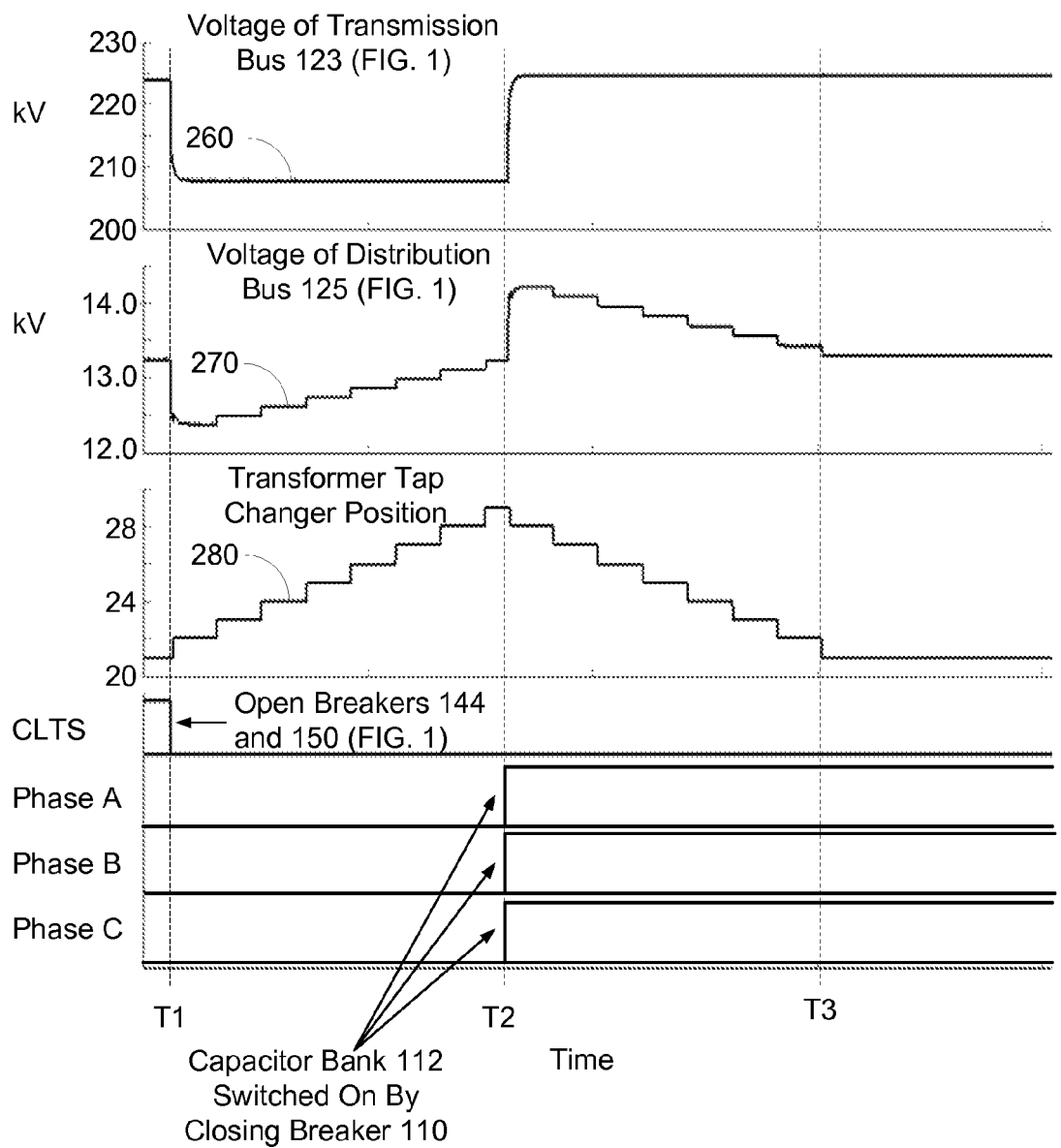
FIG. 2 illustrates one possible response of the electric power delivery system of FIG. 1 to the removal of a transmission line from service.

FIG. 2 illustrates one possible response of electric power delivery system 100 (FIG. 1) to the removal of transmission line 120a (FIG. 1) from service at time T1. In the illustrated response, breakers 144 and 150 are opened simultaneously at time T1. As one of skill in the art will appreciate, breakers 144 and 150 may not necessarily opened simultaneously, especially in cases where breakers 144 and 150 are opened manually. On the contrary, without the systems and methods disclosed herein for performing time-synchronized actions, breakers 144 and 150 may open at different times, and may thus cause unwanted disruption in electric power delivery system 100 (FIG. 1).

Graph 260 illustrates the voltage of bus 123 (FIG. 1), while graph 270 illustrates the voltage of bus 125 (FIG. 1). Graph 280 illustrates the position of a tap changer associated with bus 125. The removal of transmission line 120a (FIG. 1) from service causes the voltages of buses 123 and 125 (FIG. 1), shown in graphs 260 and 270, respectively, to drop. In response to the drop in voltage on bus 125, the tap changer associated with step-down power transformer 124 (FIG. 1) increments the tap to accommodate for the lower voltage, as shown in graph 280. Subsequently, at time T2 an operator identifies the low voltage on buses 123 and 125 (FIG. 1) and sends a command to IED 162 (FIG. 1) to actuate capacitor bank breaker 110 (FIG. 1) and connect capacitor bank 112 (FIG. 1). Capacitor bank 112 (FIG. 1) switches on, providing the reactive power support, thereby raising the voltage on bus 123 to nominal. The additional reactive power causes the voltage on bus 125 to go above nominal, thus causing the tap changer to decrement the tap position, as shown in graph 280. At time T3 the voltage on bus 123 (FIG. 1) and bus 125 (FIG. 1) is returned to nominal.

FIG. 2 illustrates the potential for unwanted wear and tear in electric power delivery system 100 (FIG. 1) caused by the removal of transmission line 120a (FIG. 1) from service. As is also shown in FIG. 2, the removal of transmission line 120a (FIG. 1) from service impacts the quality of the power delivered by electric power delivery system 100 (FIG. 1).

Using the systems and methods disclosed herein, the shifting and balancing, as shown in FIG. 2, may be reduced or eliminated. The reaction to the removal of the transmission line may be at least partially predictable, based either on simulation or prior experience. Accordingly, a power system engineer may be able to determine and coordinate actions necessary to take transmission line 120a (FIG. 1) out of service while minimizing the shifting and balancing reactions of electric power delivery system 100 (FIG. 1). Further according to various embodiments, time coordinated instruction sets may be refined over time in order to compensate for responses that are difficult to predict or that are unpredictable.

Figure 3:
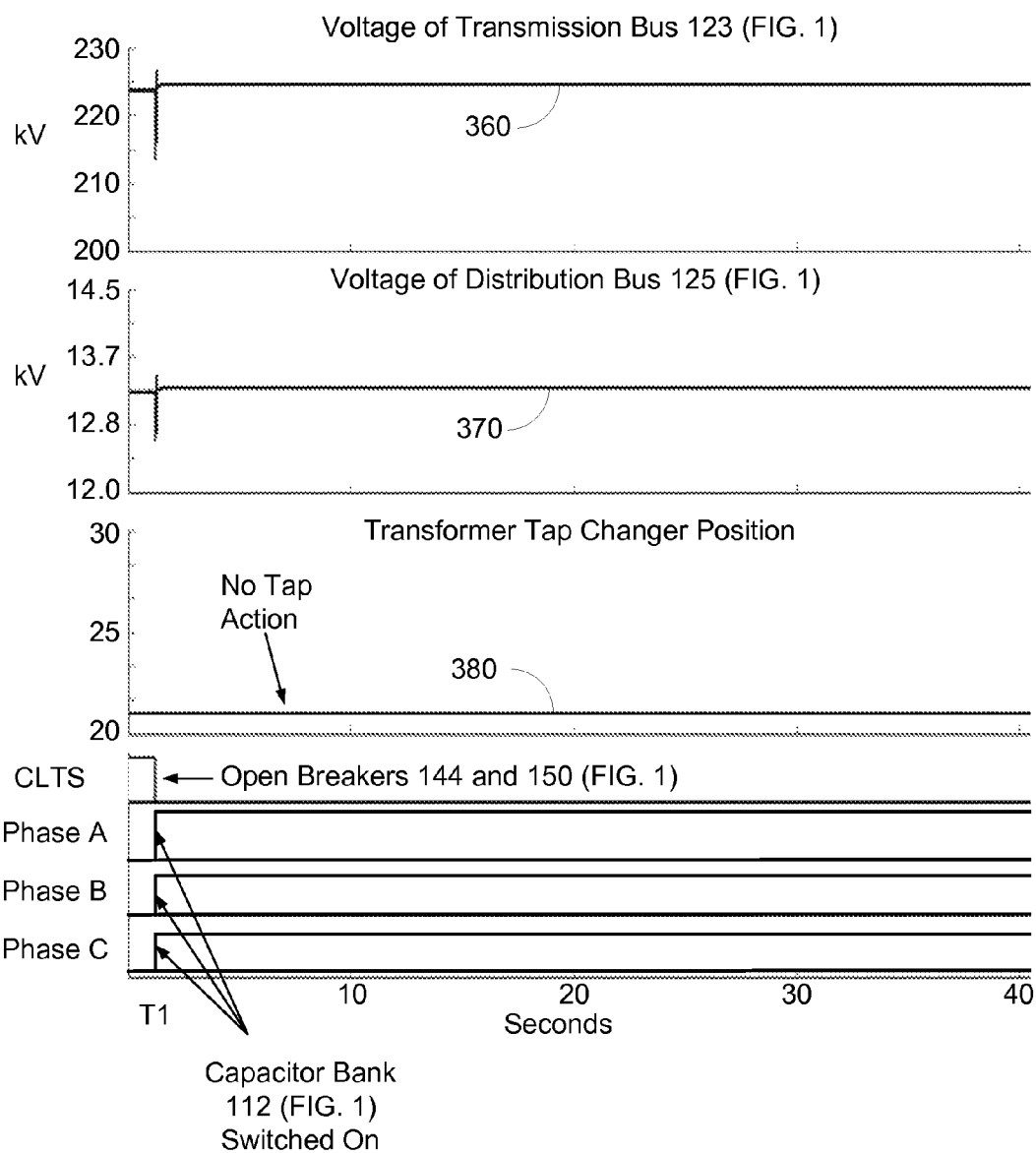
FIG. 3 illustrates an alternate response of electric power delivery system FIG. 1 to the removal of the transmission line from service.

FIG. 3 illustrates an alternate response of electric power delivery system 100 (FIG. 1) to the removal of transmission line 120a (FIG. 1) from service. In the response shown in FIG. 3 the activation of capacitor bank 112 (FIG. 1) is coordinated with the opening of breakers 144 and 150 (FIG. 1) at time T1. As shown in graph 360 of FIG. 3, the voltage of bus 123 (FIG. 1) remains more constant when compared to graph 260 (FIG. 2). Similarly, graph 370 shows that the voltage of bus 125 (FIG. 1) remains more constant when compared to graph 270 (FIG. 2). Finally, graph 380 illustrates that no tap action is required to maintain the voltage of bus 125 (FIG. 1). Further, the response shown in FIG. 3 better maintains the quality of electric power delivered by electric power delivery system 100. As mentioned earlier, voltage regulators may need to tap up or down in response to a change in voltage. In other circumstances, where tap changes may be necessary to restore balance to a system, such tap steps may be included in the time coordinated instruction set. In such a scenario, instructions may be sent to an appropriate IED, (such as a voltage regulator controller) to make the appropriate adjustments at a scheduled time. For example, instructions to adjust a tap value may be placed in a time coordinated instruction set to execute at a scheduled time with respect to other operations.

Figure 4:
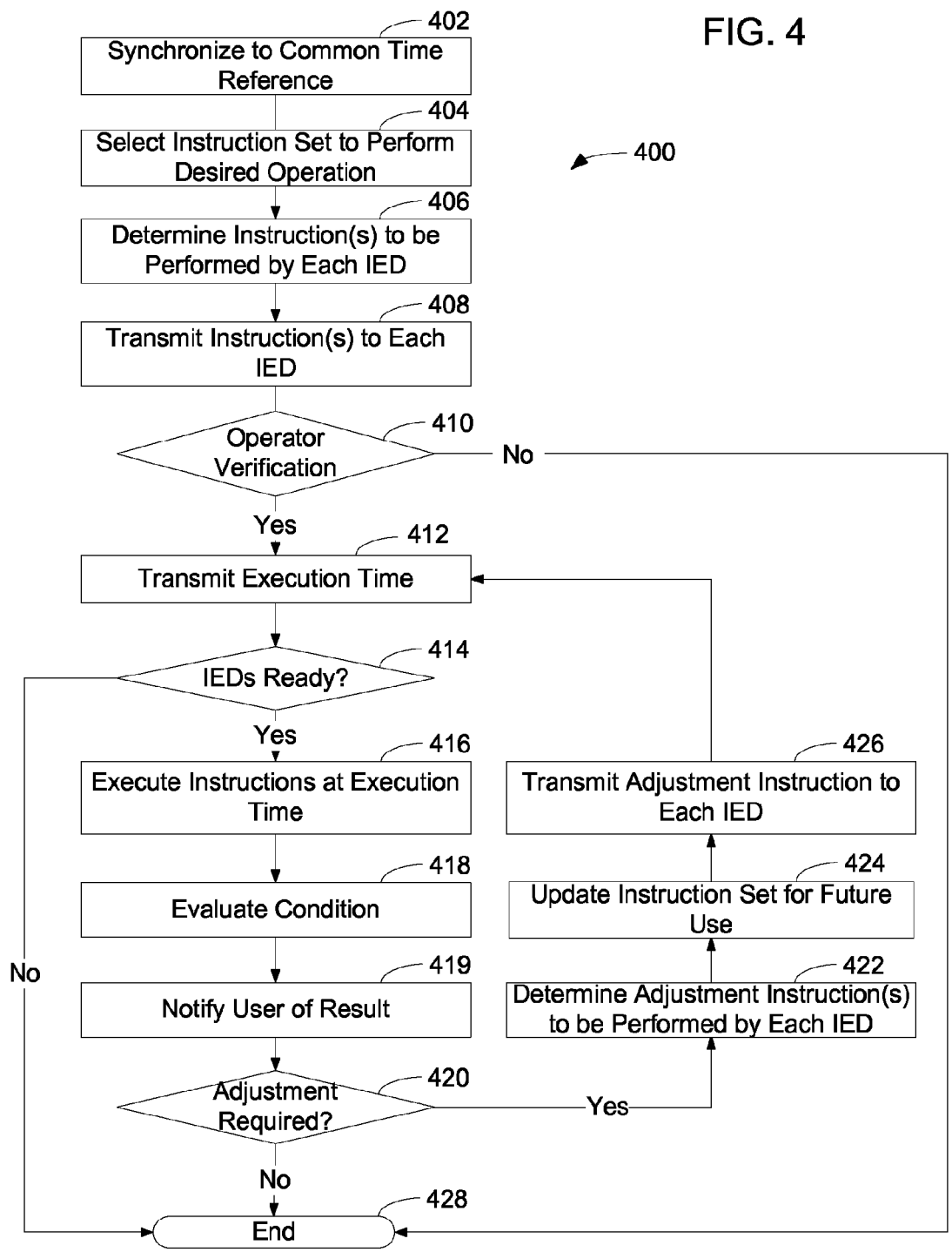
FIG. 4 illustrates a flowchart of one embodiment of a method for performing time coordinated action in an electric power system.

FIG. 4 illustrates a flowchart of one embodiment of a method 400 for performing time coordinated action in an electric power system. At 402, various devices are synchronized to a common time reference. The common time reference may be used by each device to determine when to execute a time coordinated action. At 404, an instruction set is selected to perform a desired operation. The selection may be manual (e.g., may be made by an operator making adjustments) or the selection may be automatic based on conditions on the electric power system (e.g., the detection of oscillation in the power system, the need to balance reactive power, the detection of a fault on a transmission line, the specific configuration of the system such as whether certain breakers are open or closed, etc.). Various embodiments may allow for both manual selection of time coordinated instruction sets and automatic selection of time coordinated instruction sets. An time coordinated instruction set may be manually selected in a variety of ways, including by way of SCADA system 182 (FIG. 1), WCSA system 180 (FIG. 1), local HMI 186 (FIG. 1), automation controller 172 (FIG. 1), or from other sources. Time coordinated instruction sets may be developed for a wide variety of conditions, including but not limited to removing a transmission line from service, correcting overcurrent conditions, correcting undervoltage conditions, correcting out-of-balance conditions, correcting excessive power swing conditions, configuring an electric power delivery system to maximize use of renewable-type generation, damping oscillations, shedding excessive load, responding to demand, and the like.

At 406, it may be determined which instructions of the time coordinated instruction set are to be performed by each IED. In one embodiment, an automation controller may make the determination, and in another embodiment each IED may receive the entire time coordinated instruction set and individually determine which step or steps it is to execute. However, if the IED already has the instruction sets stored, then only the determination of which instructions are to be performed by each IED 406 is performed. At 408, instructions may be transmitted to each IED. Again, if the instruction sets are already stored on the various IEDs, step 408 may be omitted, and an identification of the instruction set to be performed may be transmitted in place of transmitting individual instructions.

Certain embodiments may require operator verification 410 in order to increase the security of the system. Verification may consist of the IED notifying an operator that it has been instructed to execute a certain sequence of time coordinated instructions, from a specific time coordinated instruction set. The operator can confirm and arm the system if execution of the instruction set is appropriate. If the notification was not expected, or if the notification contains a set of time coordinated instructions that was not expected, then the operator does not arm the system. An unexpected request to execute by the IED or automation controller could be due to communication channel errors, or it could be due to a malicious attempt to sabotage the electric power delivery system. Some embodiments including operator verification may allow for additional time between selection of a time coordinated instruction set and execution of the time coordinated instruction set, and may therefore provide a time interval to validate execution of the selected time coordinated instruction set. If operator verification is not received, method 410 may end 428. Alternatively, upon verification, the system may then begin preparations to execute the selected time coordinated instruction set at a specified time or upon sensing a certain system state. In certain embodiments, operator verification may require the user to enter (or re-enter) a security password.

At 412, an execution time may be transmitted to each IED. The execution time of each time coordinated instruction set step can either be relative to the initiation of the time coordinated instruction set or can be a common time, shared among the coordinating IEDs. Further, the execution time may indicate a single time at which each instruction is to be executed, or alternatively, a particular execution time may be associated with each instruction, such that the instructions constituting the time coordinated instruction set are performed in a particular sequence and at specific times. In the relative case, the time coordinated instruction set may be programmed to start at a specified time, and then each step executes at fixed pre-defined intervals after the start of the time coordinated instruction set. This enables the same time coordinated instruction set to be used at different times. The accuracy of the execution instant of the predefined intervals depends on the application. For some applications it could be based on internal timers in each IED. For applications requiring tighter coordination of the control actions, then a time reference such as GPS may be used.

At 414, the readiness of each IED may be confirmed. In various embodiments, the readiness of each IED may be confirmed by querying each of the IEDs used to implement the time coordinated instruction set to ensure that each IED has received the instruction(s) it is to execute and that the monitored equipment controlled by IED is not faulty. The IED may perform this autonomously and then notify the SCADA operator, WCSA operator, automation controller, or other IEDs if there is a problem. This check may include checking breaker status (open, closed, failed), currents, voltages, bus voltage, breaker health (wear), and the like. The time coordinated instruction set may include a set of thresholds or statuses and check the messages including the above-listed information against the thresholds to determine if the time coordinated instruction set is safe to run. If any of the IEDs are not ready to execute the instruction(s), method 400 may end 428.

At 416, the instructions are executed by the respective IEDs. The same time coordinated instruction set can also be used at different times if the instructions are specified by a time offset (rather than a common time, shared among the coordinating IEDs) and then the initiation command includes the common time to start the time coordinated instruction set. In certain embodiments, each instruction within a time coordinated instruction set may include a separate execution time. In such embodiments, instructions comprised in a time coordinated instruction set may be stored in any order. Each IED executing at least one instruction of the time coordinated instruction set may parse the time coordinated instruction set and execute each instruction at an execution time specific to each instruction.

In certain embodiments, at 418 a condition may be evaluated after the execution of the time coordinated instruction set. For example, a condition to be evaluated may be a voltage at a particular bus. The voltage may be compared against a pre-determined value. The evaluation of other conditions is also contemplated. At 419 a user notification may be provided indicating whether execution of the time coordinated instruction set produced the result specified by the condition. In various embodiments, a plurality of conditions may be evaluated, while in some embodiments, only a single condition may be evaluated.

At 420, it is determined based on the evaluation of the specified condition whether adjustment is required. The determination of whether adjustment is required may depend on the type of condition evaluated. For example, if a bus voltage is evaluated, adjustment may be required if the bus voltage is either above or below a range of acceptable voltages. If adjustment is required, at 420, adjustment instructions may be determined at 422.

In various embodiments, the condition to be evaluated may ensure that the instructions were executed, and remedial action schemes may be implemented in cases where the instructions were not implemented. For example, if the time coordinated instruction set to remove line 120a (FIG. 1) for service was executed, but breaker 150 remains closed, transmission line 120a would not be out of service, and would be dangerous for utility personnel to operate thereon. Accordingly, an adjustment instruction may be generated instructing the remaining circuit breaker 144 to close. The close step may be selected to execute at subsequent specified times. Thus, the remedial action itself also can be a time coordinated response. One remedial course of action may be to run the time coordinated instruction set in reverse and notify a user that the time coordinated instruction set failed.

A study of the particular architecture of the electric power delivery system may indicate which remedial operations would be required for a particular operation. Such study may include the use of a real-time digital simulator, and are not treated in detail here, except in that such a study may result in a detailed list of which remedial operations would be needed, the order of the operations, and the timing of the operations. This may save the downstream IEDs and equipment from needing to react to what are otherwise unexplained variances from nominal operating conditions. The time coordinated instruction set may further include a step to notify a user that execution of the time coordinated instruction set failed.

The evaluation of one or more conditions at 418, and the determination of appropriate adjustment instructions may be employed in certain embodiments as a feedback mechanism that allows for one or more conditions of an electric power delivery system to be incrementally adjusted through repeated iterations.

Further, in certain embodiments, in addition to implementing the adjustment instructions, at 424 the time coordinated instruction set may be updated so that in the future, execution of the selected instruction set may reduce or eliminate the need for the adjustment instructions. In other words, the time coordinated instruction set may be refined in successive executions. In this way, a database of time coordinated instruction sets may be refined and customized to a particular electric power system. For example, returning to the scenarios discussed above regarding removing transmission line 120*a* (FIG. 1) from service, it may be determined after execution of a time coordinated instruction set at 416 and evaluation of a specified condition at 418 that an adjustment instruction consisting of shedding certain loads is necessary in order to balance electric power delivery system 100 (FIG. 1). Accordingly, at 424, the time coordinated instruction set for removing transmission line 120*a* (FIG. 1) may be updated. In the updated version of the time coordinated instruction set, in addition to closing breaker 110 and opening breakers 144 and 150 (FIG. 1), the time coordinated instruction set will also shed the necessary loads. In this way, through repeated executions of time coordinated instruction sets, the time coordinated instruction sets may be refined and improved in order to reduce or eliminate the need for one or more adjustment instructions.

The adjustment instructions may be transmitted to each IED at 426, and method 400 may then proceeding as described above by transmitting an execution time 412 and determining whether the IEDs are ready 414.

In one embodiment method 400 may be implemented as a computer program, or a computer programs executable on two or more IEDs in communication with each other via a communications network. Such embodiments, may further utilize timestamps associated with one or more instructions, and the timestamps and instructions may be communicated between the IEDs. Further, a common time signal may be distributed, such that each IED in communication with the communications network utilizes the same time source.

Figure 5:
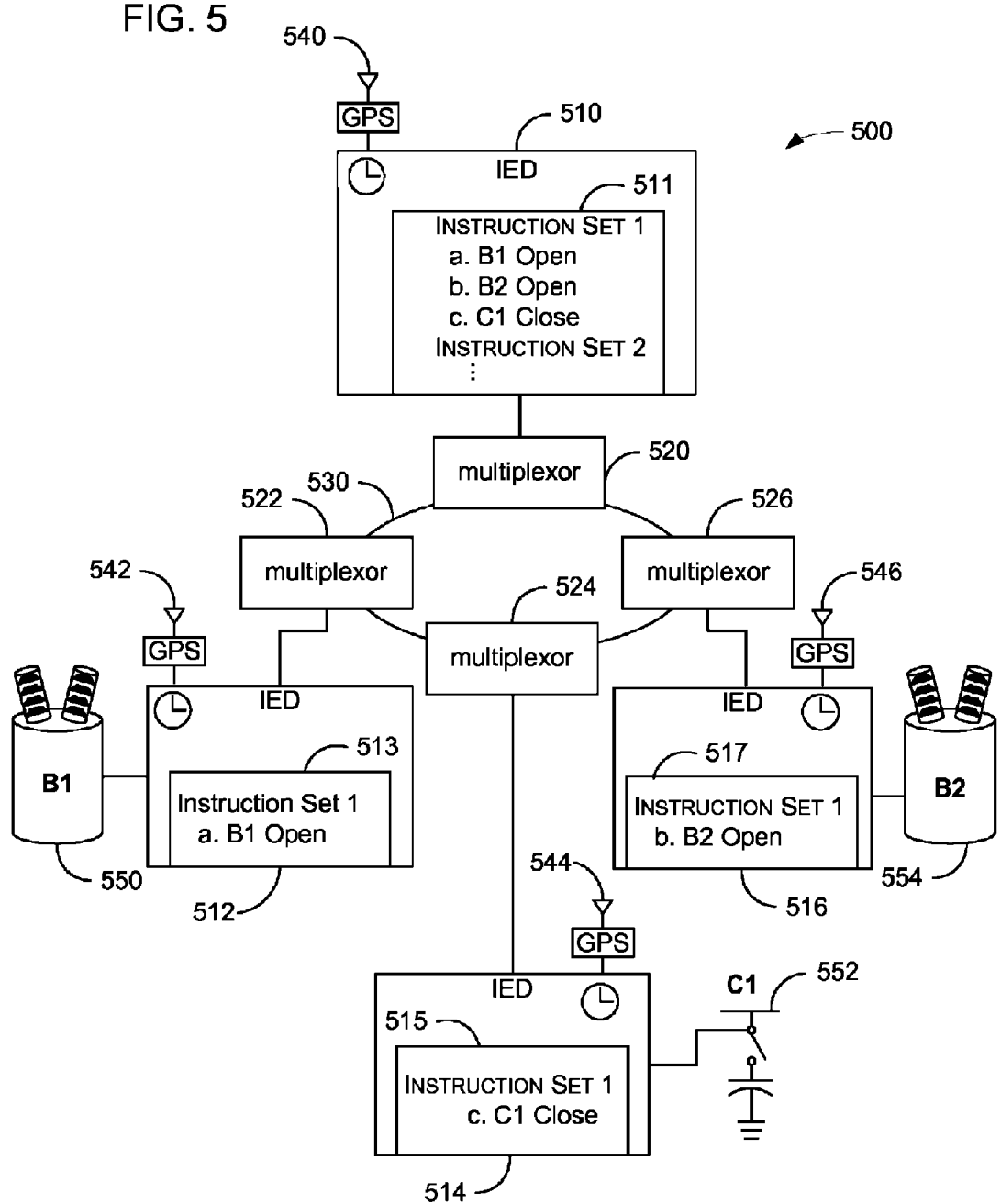
FIG. 5 illustrates one embodiment of an electric power delivery system in which a set of IEDs are configured to execute a time coordinated instruction set.

FIG. 5 illustrates one embodiment of an electric power delivery system 500 in which a set of IEDs are configured to execute a time coordinated instruction set. In contrast to electric power delivery system 100 (FIG. 1), discussed above, electric power delivery system 500 does not include a central communications processor. Electric power delivery system 500 includes IEDs 510-516. IEDs 510-516 are interconnected by network 530 and multiplexors 520-526. As illustrated, network 530 is configured in a ring topology, in which each of multiplexors 520-526 are connected to two other multiplexors. Each IED 510-516 includes a GPS input 540-546, and may derive a common time signal based on the GPS satellite system.

In the illustrated embodiment, IED 510 includes a database of time coordinated instruction sets 511, including instruction set 1. Instruction set 1 includes three instructions, namely opening breaker B1 550, opening breaker B2 554, and closing switch C1 552. IED 510 may disseminate instructions 513, 515, and 517 to IEDs 512, 514, and 516, respectively, via network 530. Alternatively, each of IED 510, 512, 514, and 516 may contain the time coordinated instruction sets from another source such as SCADA, WCSA, preprogrammed directly, etc. IED 510 may confirm the readiness of each IED to execute the respective instructions and may set an execution time at which each IED is to execute the respective instructions or the IEDs may confirm collectively. Following the execution of instruction set 1, each IED 510-516 may evaluate a condition (e.g., whether each of breakers B1 and B2 opened and whether switch C1 closed), and may report the results of the evaluation to IED 510. If necessary, remedial or adjustment instructions may be implemented based on the evaluation of the condition.

Figure 6:
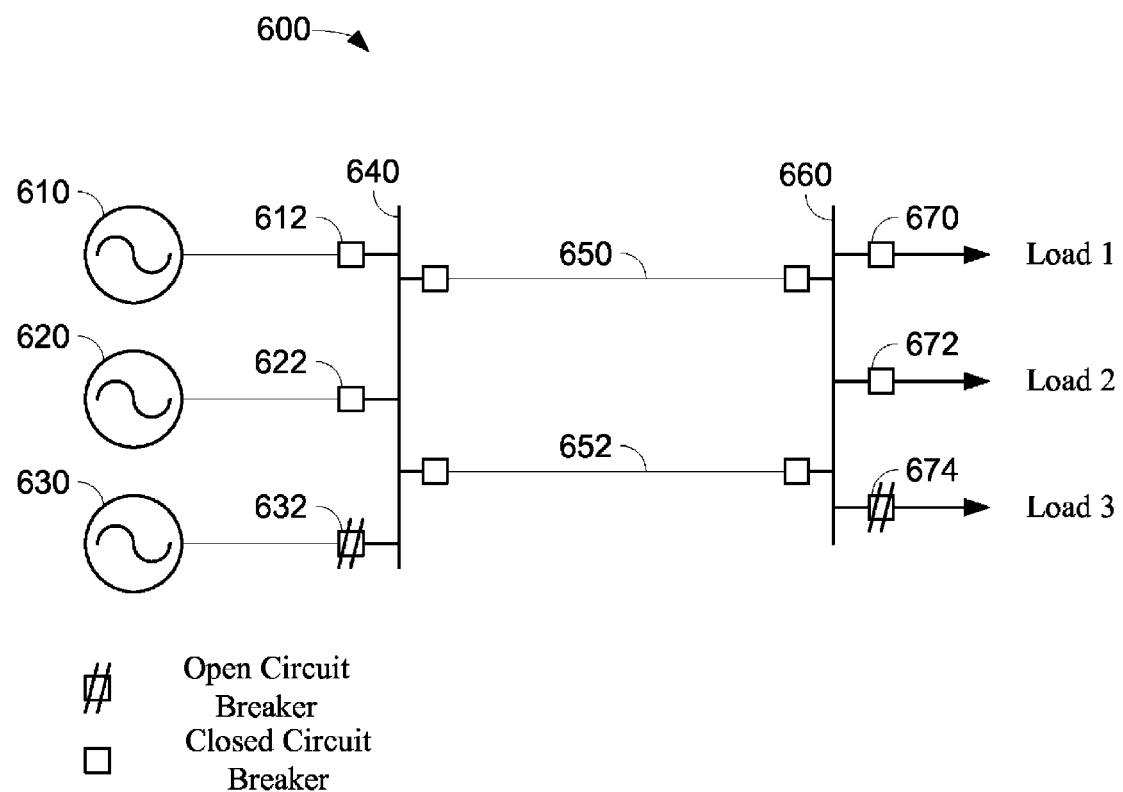
FIG. 6 illustrates another example of an electric power delivery system in which time coordinated instruction sets may be utilized to coordinate feeding a predetermined load using a predetermined source.

FIG. 6 illustrates another example in which time coordinated instruction sets may be utilized to coordinate feeding a predetermined load using a predetermined source. In the example illustrated in FIG. 6, an electric power delivery system 600 includes generators 610 and 620, which may be base load generators configured to satisfy loads 1 and 2. Generator 630 may be a "peaking" generator or may represent a non-continuous power source (e.g., a wind farm). Generators 610, 620, and 630 are selectively connected to bus 640 via breakers 612, 622, and 632, respectively. Bus 640 is connected by transmission lines 650 and 652 to bus 660. Loads 1, 2, and 3 may be selectively connected to bus 660 using breakers 670, 672, and 674, respectively.

A time coordinated instruction set may coordinate the closing of breakers 632 and 674, among other actions, and based on various conditions in such a way so as to minimize disruptions to electric power delivery system 600. In various embodiments, such conditions may include the availability of less-expensive electric power, the availability of non-dispatchable power (e.g., wind power or solar power), the arrival of a particular time of day, detecting a particular load threshold, the unavailability of other power sources, and the like. In one example, if prevailing wind conditions are known, and matching load conditions are known to exist during a time of prevailing high-wind conditions, the time coordinated instruction set may be configured to modify an electric power delivery system to supply the predetermined matching load with electric power from a wind farm in certain wind conditions.

In certain embodiments, the time coordinated instruction set that closes breakers 632 and 674 may be self-activating upon occurrence of a specified event (e.g., when electric power from generator 630 exceeds a specified threshold, or exceeds the requirements of load 3). The time coordinated instruction set may also be configured to phase out certain loads fed by generator 636 by providing power from generators 610 or 620, when power from generator 630 is no longer available (in the case of non-dispatachable sources) or no longer needed (in the case of a peaking generator).

In still other embodiments, time coordinated instruction sets may be developed for bringing various types of equipment online. For generator protection, for example, the time coordinated instruction set may include steps for switching a generator protection relay to a startup mode due to the low starting frequency of the generator. When the generator reaches the appropriate frequency and is appropriately synchronized, the generator protection relay may connect the generator to an electric power delivery system. Similarly, time coordinated instruction sets may be developed for switching on motors, switching off motors, dropping loads, and so forth.

Time coordinated instruction sets may be designed to gather information and take alternate steps in light of the gathered information. To that end, the time coordinated instruction set may include a step to request particular information from particular IEDs or IEDs in a specified group (e.g. in communication with transmission line X, or all generator protection relays, or the like). Once the IEDs report back, the time coordinated instruction set may select the appropriate steps. In one such example, several generation sources are available at different locations on the electric power delivery system. Several capacitor banks may also be available at different locations on the electric power delivery system. The time coordinated instruction set may also balance reactive power in a particular region. The time coordinated instruction set may include a step to determine the load profile in the particular region, determine the power quality of generation closest to the particular region, and determine the status of the capacitor banks in the particular region. After gathering this information from the particular IEDs, the time coordinated instruction set can select which capacitor banks to engage (not those already being used), and whether to switch to generators that are closer to the particular region. The time coordinated instruction set may be configured to select the steps and present them to the user before continuing to execute the steps. The user can verify the steps and have the time coordinated instruction set executed using the automation controller and/or the various IEDs required to execute the time coordinated instruction set.

In certain situations, a user may want to execute a number of time coordinated instruction sets in order to cause a certain general condition in the electric power delivery system. Time coordinated instruction sets (or particular steps therein), as described above, may be organized together into menus related to general electric power delivery system conditions such that a user can enter a desired general electric power system condition into the automation controller, and the automation controller will select time coordinated instruction sets and/or steps to be taken to result in the desired conditions. Alternatively, the system conditions may be automatically determined based on measurements of the system state.

In one example, the automation controller (if present) and IEDs may include a number of time coordinated instruction sets and a database of situations where certain time coordinated instruction sets may be used. In this example, a user would be able to indicate a general preference (menu) to the IEDs (or automation controller), and the devices would then determine the time coordinated instruction sets that would be needed to result in the preference. The devices could present the time coordinated instruction sets to the user for verification, or simply begin to run the time coordinated instruction sets as required. The devices may be capable of selecting certain steps from certain time coordinated instruction sets as is needed.

Figure 7:
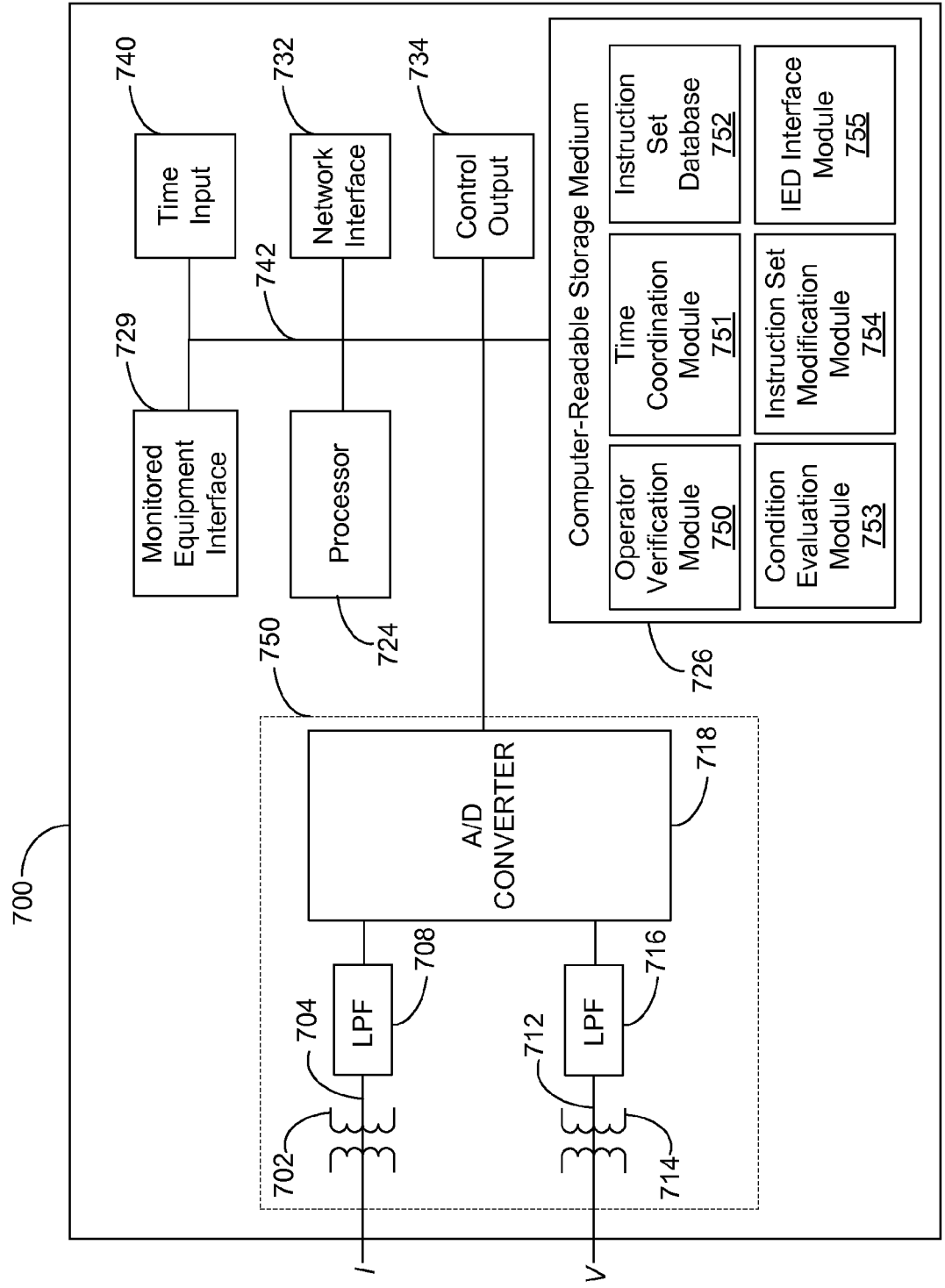
FIG. 7 illustrates an exemplary block diagram of an IED configured to implement a time coordinated instruction set and/or store time coordinated instruction sets and coordinate the execution of one or more time coordinated instruction sets among a plurality of connected IEDs.

FIG. 7 illustrates an exemplary block diagram of an IED 700 configured to implement a time coordinated instruction set and/or store time coordinated instruction sets and coordinate the execution of one or more time coordinated instruction sets among a plurality of connected IEDs. One of skill in the art will appreciate that with certain modifications, IED 700 may also serve as an automation controller according to the present disclosure. IED 700 may include a network interface 732 configured to communicate with a data network. IED 700 also includes a time input 740, which may be used to receive a time signal and synchronize the actions of IED 700 with the actions of other connected IEDs. In certain embodiments, a common time reference may be received via network interface 732, and accordingly, a separate time input would not be necessary. Such embodiments may employ any time reference (e.g., a time reference distributed via the IEEE 1588 protocol, IRIG, or a GPS time source). A monitored equipment interface 729 may be configured to receive status information from, and a control output 734 issues control instructions to a piece of monitored equipment. A data bus 742 may link monitored equipment interface 729, time input 740, network interface 732, and a computer-readable storage medium 726 to a processor 724.

Computer-readable storage medium 726 may also be the repository of various software modules configured to perform any of the functions and methods described herein. Computer-readable storage medium 726 may be the repository of an instruction set database 752 containing a plurality of time coordinated instruction sets. Computer-readable storage medium 726 may also be the repository of an operator verification module 750, a time coordination module 751, a condition evaluation module 753, an instruction set modification module 754, and an IED interface module 755. Each module may perform various functions and provide one or more aspects of the functionality described above. Operator verification module 750 may notify an operator that an instruction set is to be executed. The operator can confirm and arm the system if execution of the instruction set is appropriate. If execution of the instruction set is not expected, then the operator may not arm the system. Time coordination module 751 may establish an execution time for each time coordinated instruction set, confirm the readiness of each IED in a system to execute the a time coordinated instruction set, and manage time offset in applicable time coordinated instruction sets. Condition evaluation module 753 may be configured to evaluate specified conditions. For example, a condition may be specified to trigger the execution of a time coordinated instruction set, or a condition may be evaluated following the execution of a first time coordinated instruction set in order to determine whether a second instruction set is to be executed in order to establish a desired condition. Instruction set modification module 754 may allow for the modification of various instruction sets. For example, in instances where execution of a first time coordinated instruction set fails to result in a desired condition, and thus necessitates the execution of a second time coordinated instruction set, instruction set modification module 754 may modify the first time coordinated instruction set in order to improve the effectiveness of the first time coordinated instruction sets for achieving the desired result. IED interface module 755 may be configured to communicate a variety of types of information with various IEDs. In various embodiments, such information may include time coordinated instruction sets, specific instructions to be executed by a particular IED, particular conditions to be evaluated by a remote IED, and the like.

Processor 724 may be configured to process communications received via network interface 732, time input 740, and monitored equipment interface 729. Processor 724 may operate using any number of processing rates and architectures. Processor 724 may be configured to perform various algorithms and calculations described herein. Processor 724 may be embodied as a general purpose integrated circuit, an application specific integrated circuit, a field-programmable gate array, and other programmable logic devices.

In certain embodiments, IED 700 may include a sensor component 750. In the illustrated embodiment, sensor component 750 is configured to gather data directly from a conductor (not shown) using a current transformer 702 and/or a voltage transformer 714. Voltage transformer 714 may be configured to step-down the power system's voltage (V) to a secondary voltage waveform 712 having a magnitude that can be readily monitored and measured by IED 700. Similarly, current transformer 702 may be configured to proportionally step-down the power system's line current (I) to a secondary current waveform 704 having a magnitude that can be readily monitored and measured by IED 700. Low pass filters 708, 716 respectively filter the secondary current waveform 704 and the secondary voltage waveform 712. An analog-to-digital converter 718 may multiplex, sample and/or digitize the filtered waveforms to form corresponding digitized current and voltage signals.

In other embodiments, sensor component 750 may be configured to monitor a wide range of characteristics associated with monitored equipment, including equipment status, temperature, frequency, pressure, density, infrared absorption, radio-frequency information, partial pressures, viscosity, speed, rotational velocity, mass, switch status, valve status, circuit breaker status, tap status, meter readings, and the like. In certain embodiments sensor component 750 may be disassociated from, or physically separated from an IED. In such embodiments, a sensor component 750 may monitor an electrical characteristics of monitored equipment. Sensor component 750 may transmit data to another IED or a communication master using a sensor network communications interface.

A/D converter 718 may be connected to processor 724 by way of bus 742, through which digitized representations of current and voltage signals may be transmitted to processor 724. In various embodiments, the digitized current and voltage signals may be compared against conditions, either to determine when it may be appropriate to initiate the execution of a time coordinated instruction set or to evaluate a condition following the execution of a time coordinated instruction set.

Figure 8:
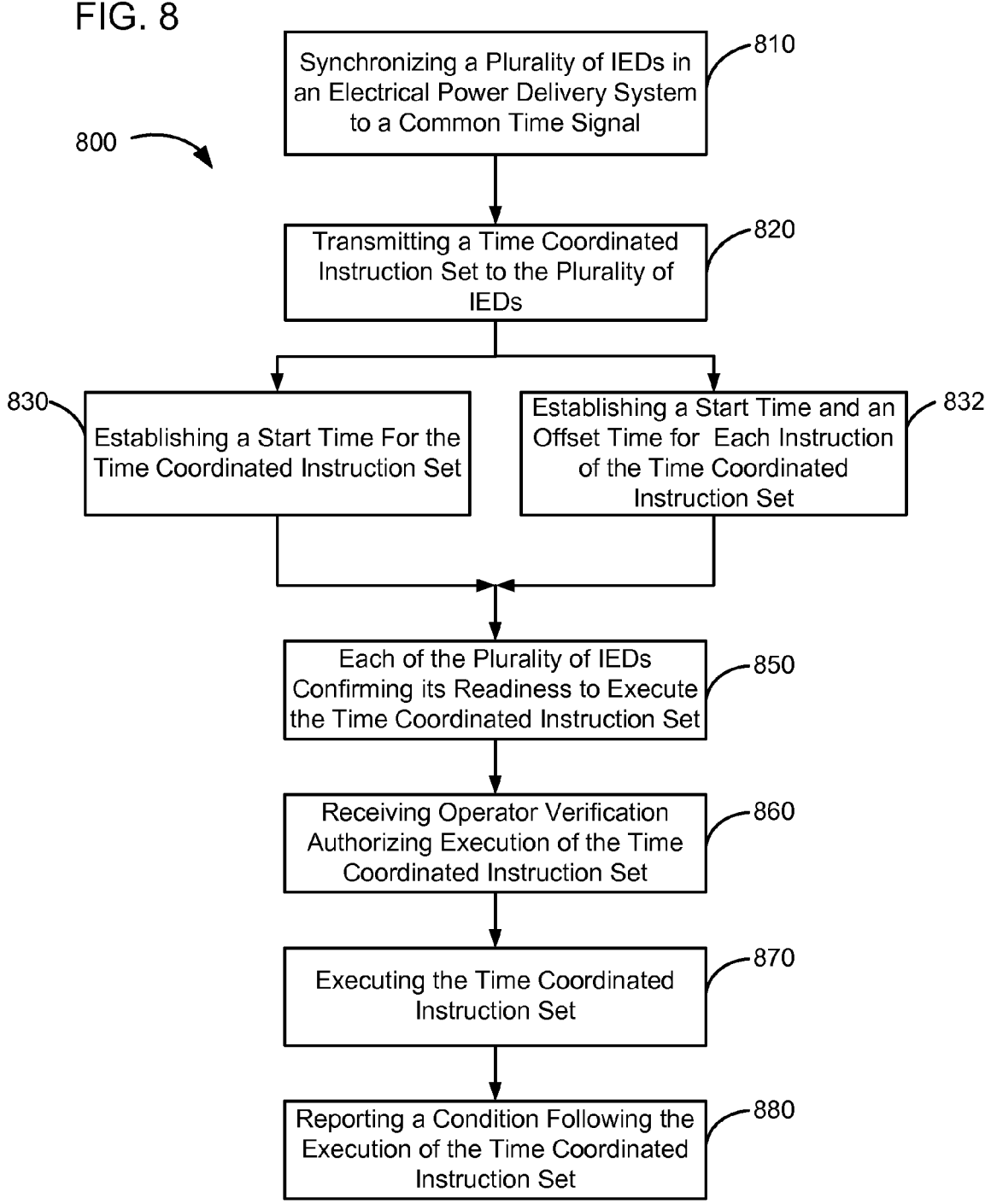
FIG. 8 illustrates a flowchart of one embodiment of a method for performing time coordinated action in an electric power system.

FIG. 8 illustrates a flowchart of one embodiment of a method 800 for performing time coordinated action in an electric power system. At 810, a plurality of IEDs in an electrical power delivery system are synchronized to a common time signal. As discussed above, a wide variety of time signals are contemplated. Certain types of time signals may be received via an external time interface (e.g., a GPS receiver), while other types of time signals may be received via a network interface (e.g., a time signal distributed via the IEEE 1588 protocol, IRIG, a network time protocol, or a simple network time protocol).

At 820, the time coordinated instruction set may be transmitted to the plurality of IEDs. The transmission of the time coordinated instruction set may be accomplished by way of a data network interconnecting the plurality of IEDs. A variety of types of data networks may be utilized, including but not limited to Ethernet or an optical network (e.g., SONET or SDH). The data network may facilitate bidirectional communication of data among the plurality of IEDs.

A start time for the time coordinated instruction set may be established at 830. The start time may be established with respect to the common time signal, to which the plurality of IEDs are synchronized. The start time may be specified as a common time, shared among the coordinating IEDs (e.g., May 4, 2010 at 11:30:00.00 GMT), as a relative time (e.g., each weekday at 11:30:00.00 GMT), or may be specified based on the occurrence of a particular condition (e.g., five minutes after the detection of a specified condition). In various embodiments, a start time may be established for an entire instruction set, and each instruction within the time coordinated instruction set may be executed as quickly as possible.

In other embodiments, or based upon the requirements of a particular instruction set, at 832, an offset time for each instruction of the time coordinated instruction set may be specified. The offset time may be based on the start time or the execution time of the previously executed instruction. Such embodiments may allow for an instruction set to specifically control the timing of actions taking place on the electrical power distribution system. Such actions may take place across a wide geographically distributed area.

Each of the plurality of IEDs may confirm its readiness to execute the time coordinated instruction set at 850. In determining the readiness of each IED to execute the time coordinated instruction set, each IED may check criteria. Such criteria may include checking breaker status (open, closed, failed), currents, voltages, bus voltage, breaker health (wear), and the like. In various embodiments, the time coordinated instruction set may include a set of thresholds or statuses and check the messages including the above-listed information against the thresholds to determine if the time coordinated instruction set is safe to run.

At 860, an operator verification may be received that authorizes execution of the time coordinated instruction set. Operator verification may provide one mechanism to prevent malicious attempts to sabotage the electric power delivery system. Assuming that execution of the time coordinated instruction set is appropriate, an operator may provide verification and prepare the electric power distribution system to execute the time coordinated instruction set.

After receiving operator verification, the time coordinated instruction set may be executed at 870. Executing the time coordinated instruction set may, in various embodiments, involve time coordinated actions taken by a plurality of IEDs geographically distributed across an electric power distribution system. The synchronization of each of the plurality of IEDs using the common time source may allow for time coordinated action across a wide georgraphic area.

Finally, at 880, one or more IEDs may report a condition following the execution of the time coordinated instruction set. In various embodiments, an instruction set may be executed in order to create a particular condition or configuration of the electric power delivery system. An instruction set may include one or more conditions to be evaluated after execution of the time coordinated instruction set in order to confirm that execution of the time coordinated instruction set resulted in the desired condition or configuration. If execution of the time coordinated instruction set did not result in the desired condition or configuration, an adjustment instruction set may be executed.

Figure 9:
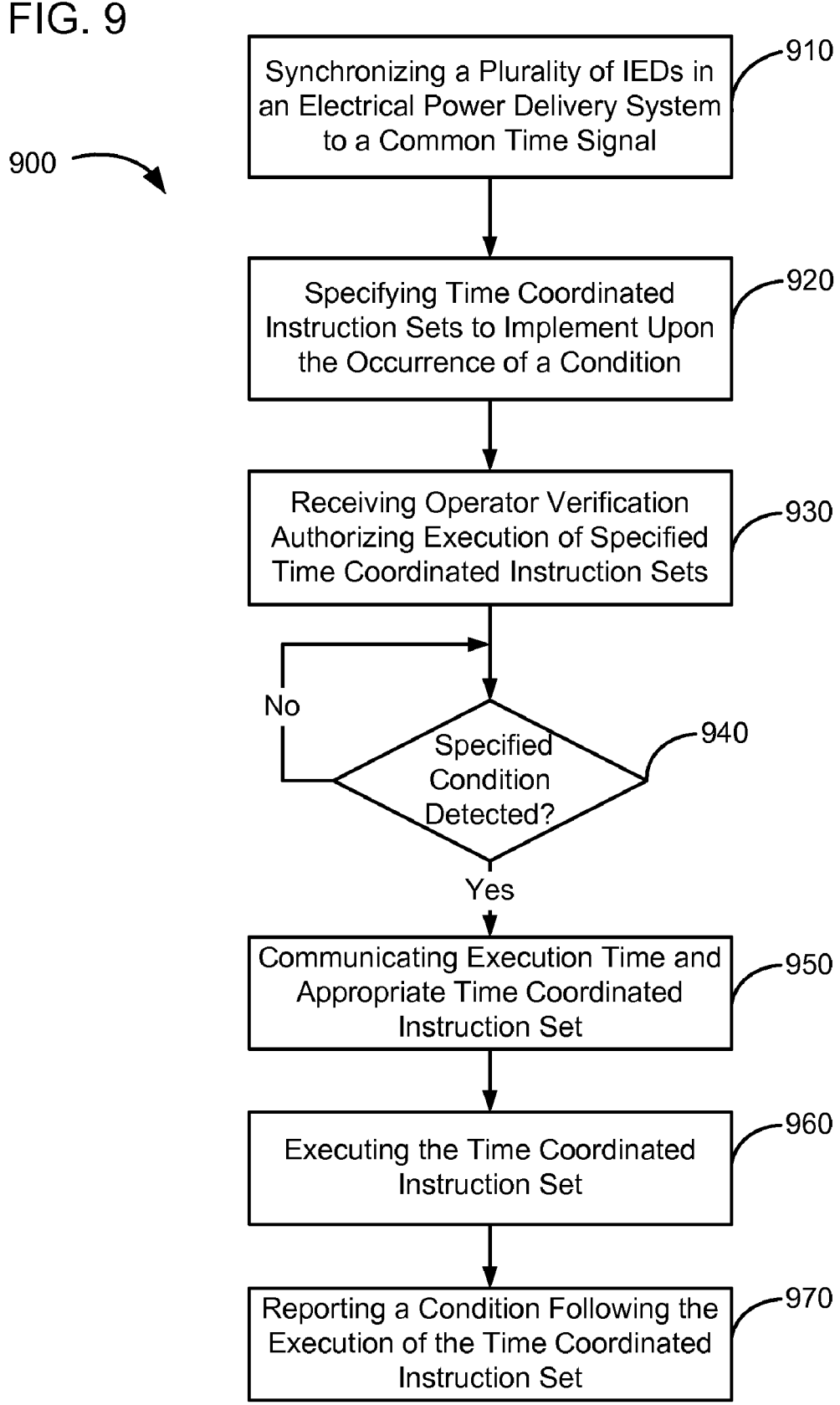
FIG. 9 illustrates a flowchart of one embodiment of a method for performing time coordinated action in an electric power system based on the detection of a specified condition.

FIG. 9 illustrates a flowchart of a method 900, in which time coordinated action is triggered based upon the occurrence of a specified condition within an electric power system. In the embodiment illustrated in FIG. 9, each IED has already stored a plurality of time coordinated instruction sets and determined which IEDs will perform each action in the various instruction sets. Accordingly, upon the occurrence of the specified condition, each IED is prepared to take the specified time coordinated action. At 910, a plurality of IEDs in an electrical power delivery system are synchronized to a common time signal. As discussed above, a wide variety of time signals are contemplated. Certain types of time signals may be received via an external time interface (e.g., a GPS receiver), while other types of time signals may be received via a network interface (e.g., a time signal distributed via the IEEE 1588 protocol, IRIG a network time protocol, or a simple network time protocol).

At 920, time coordinated instruction sets to be implemented upon the occurrence of a condition may be specified. A variety of time coordinated instruction sets may be developed in order to accommodate a wide variety of possible circumstances. For example, one instruction set may be developed when power consumption exceeds a specified threshold. In another example, a predetermined instruction set may be developed to reconfigure an electric power delivery system in the event of a fault on a transmission line, for example. A wide variety of other circumstances are also contemplated.

At 930, operator verification authorizing execution of specified time coordinated instruction sets may be received.

As discussed above, receiving operator verification may provide for greater security. According to various embodiments, operator verification may be obtained in advance of the execution of time coordinated instruction sets, such that upon the occurrence of a specified condition, execution of a time coordinated instruction set is not delayed by obtaining operator verification. In other words, once verification has been provided, the appropriate time coordinated instruction set may be executed automatically.

At 940, method 900 and determines whether any specified conditions are detected. A variety of types of conditions may be monitored (e.g., voltage on a particular bus, current through a particular transmission line, power consumption, etc.).

Once a specified condition is detected, method 900 may communicate the execution time and the appropriate time coordinated instruction set to be appropriate IEDs 950. As noted above, the IEDs may be pre-programmed with a variety of time coordinated instruction sets, each of which may be specified by a short transmission, regardless of the length of the time coordinated instruction set. For example, in various embodiments time coordinated instruction sets may be specified using numerical values (e.g., time coordinated instruction set 1, time coordinated instruction set 2, etc.). The execution time may also be specified at some point in the future, or the execution time may simply be executed upon receipt of the appropriate command by each IED. In systems including a low-latency communication network, time coordinated action may result from a communication master sequentially instructing various IEDs to immediately perform specified actions. At 960, the time coordinated instruction set is executed by each IED at the appointed time. Following the execution of the time coordinated instruction set a condition may be reported at 970. Reporting of the condition they enable a system operator to confirm a desired condition upon the execution of the time coordinated instruction set.

Figure 10:
FIG. 10 illustrates one example of a time coordinated instruction set, in which time coordinated actions are triggered upon the occurrence of the specified conditions and specified time offsets.

FIG. 10 illustrates one example of a time coordinated instruction set 1000, in which time coordinated actions are triggered upon the occurrence of the specified conditions and specified time offsets. FIG. 10 shows the instructions for one of the IEDs in the system. A separate set of instructions and time offsets may be stored in each IED in a system. These separate sets might be identical for all IEDs or they might be different for each IED. In the illustrated example, time coordinated instruction set 1000 includes particular instructions shown in column 1007 that are to be executed upon the occurrence of the condition shown in column 1006. In the illustrated example instructions are mainly referred to using a reference number. Instructions to be executed in connection with a time coordinated instruction set may include any action that an electric power transmission and distribution system is able to automatically perform. Such actions include, but are not limited to, opening or closing a breaker, stepping up or stepping down a transformer, connecting or disconnecting a load, connecting or disconnecting a capacitor bank, connecting or disconnecting a transmission line, connecting or disconnecting a generation source, etc. Finally, column 1009 illustrates the time at which each instruction is executed.

In the illustrated example, time coordinated instruction set 1000 is initiated at 1001, upon the detection of a specified condition (i.e., $V \leq 220$ kV). Similar conditions may be used in a variety of time coordinated instruction sets in order to ensure that a voltage on a particular bus with in an electric power transmission and distribution system remains above a specified threshold. In other examples, other conditions may be monitored (e.g., current through a particular transmission line, power delivered to a load, power generated by source a specified reactive power measurement, etc.). In the illustrated example, occurrence of the specified condition corresponds to time $T_o$. Following the detection of a specified condition at 1001, the next instruction 1002 occurs upon the passage of a specified time interval $t_1$. On the passage of the specified time interval, instruction I2 is to be executed.

The next instruction at 1004 illustrates that a time coordinated instruction set may include evaluation of specified conditions and execution of different instructions based on the results of the evaluated criteria. In the illustrated example, the criteria to be evaluated compares a particular voltage against a second threshold. If the voltage is less than the specified threshold instruction I4 is executed at time $T_o+T_3$. Otherwise, if the voltage is greater than the second threshold, instruction I5 is executed at $T_o+T_4$. In addition to evaluation of "if-then-else" in predetermined instruction sets, a variety of other types of logical evaluations may also be included in predetermined instruction sets. In one particular embodiment, SELogic® programming language, available from Schweitzer Engineering Laboratories, Inc. may be utilized as a programming language for expressing time coordinated instruction sets.

In various embodiments, a variety of programming languages and programming techniques may be used to implement the time coordinated instruction sets. Programming techniques may include function calls, if/then/else statements, goto statements, variables assignments, etc. Using various programming languages and data structures, each instruction may be associated with a timestamp or time offset in order to allow for execution in a time coordinated manner.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A system for controlling an electric power delivery system, comprising:
   a communications network;
   a plurality of intelligent electronic devices (IEDs), each IED comprising:
   an IED network communications interface connected to the communications network, the IED network communications interface to communicate with other IEDs connected to the communications network; and
   a monitored equipment interface to issue control instructions to monitored equipment;
   a communication master in communication with the plurality of IEDs via the communications network, the communication master comprising:
   a processor;
   a communication master network communications interface to communicate with the plurality of IEDs connected to the communications network;
   a computer-readable storage medium comprising:
   a time coordinated instruction set comprising at least one execution action for execution by the monitored equipment; and
   instructions executable on the processor that enable the communication master to:
   establish an execution time of a time coordinated instruction set comprising at least one execution action; and transmit the execution time to the plurality of IEDs via the communication master network communications interface; and wherein, the plurality of IEDs begin to execute the time coordinated instruction set at the execution time for time coordinated execution by the monitored equipment.

2. The system of claim 1, wherein at least one of the plurality of IEDs comprises an IED external time input configured to receive an external time signal from an external time source, and wherein the external time signal is utilized to determine the execution time.

3. The system of claim 1, wherein at least one of the plurality of IEDs comprises a sensor component configured to monitor at least one electrical characteristic of monitored equipment.

4. The system of claim 3, wherein the at least one of the plurality of IEDs is configured to evaluate a condition subsequent to the execution time using the at least one characteristic monitored by the sensor and to communicate a result of the evaluated condition to the communication master.

5. The system of claim 1, wherein the computer-readable storage medium further comprises instructions executable on the processor to enable the communication master to transmit the time coordinated instruction set via the communication master network communications interface to the plurality of IEDs.

6. The system of claim 1, wherein the computer-readable storage medium further comprises software instructions to:
obtain verification from a user prior to establishing an execution time.

7. The system of claim 1, wherein the computer-readable storage medium further comprises software instructions to:
query each of the plurality of IEDs identified to perform each execution action of the time coordinated instruction set prior to the execution time to determine readiness of each IED to perform each respective execution action of the time coordinated instruction set.

8. The system of claim 1, wherein the communcations master comprises an automation controller.

9. The system of claim 1, wherein the communication master comprises an IED.

10. The system of claim 1, wherein the communication master comprises a supervisory control and data acquisition system.

11. The system of claim 1, wherein the communication master comprises a wide area control and situational awareness system.

12. The system of claim 1, wherein the time coordinated instruction set comprises a plurality of execution actions, and wherein the computer-readable storage medium further comprises software instructions to:
identify which of the plurality or IEDs is to perform each of the plurality of execution action of the time coordinated instruction set; and
transmit each execution action to the respective IED.

13. The system of claim 1, wherein the time coordinated instruction set comprises a plurality of execution actions and at least one of the plurality of execution actions is associated with an offset time, the offset time specifying an offset execution time that follows the execution time by the offset time.

14. An IED configured to monitor and control a monitored equipment in an electric power delivery system, the IED comprising:
an IED network communications interface to communicate with a communication master including a time-coordinated instruction set and establishing an execution time;
a monitored equipment interface to issue control instructions to monitored equipment in an electric power delivery system;
a processor, and
a computer-readable storage medium comprising:
software instructions executable on the processor that enable the IED to:
receive from the communication master at least one execution action associated with the time coordinated instruction set for execution by the monitored equipment via the IED network communications interface, the at least one execution action comprising a control instruction to be issued to monitored equipment via the monitored equipment interface;
receive from the communication master the execution time; and
execute the at least one execution action at the execution time for time coordinated execution by the monitored equipment.

15. The IED of claim 14, further comprising:
an IED external time input configured to receive an external time signal from an external time source;
wherein the external time signal is used to determine the execution time.

16. The IED of claim 14, further comprising a sensor component configured to monitor at least one characteristic of monitored equipment, and wherein the IED is configured to evaluate a condition monitored by the sensor subsequent to the execution time and to communicate a result of the evaluated condition via the IED network communications interface.

17. The IED of claim 14, wherein the computer-readable storage medium further comprises software instructions to:
generate a response to a query received via the IED network communications interface prior to the execution time to determine readiness of the IED to perform the at least one execution action.

18. The IED of claim 17, wherein the computer-readable storage medium further comprises software instructions to:
determine a status of monitored equipment via the monitored equipment interface; and
include the status of monitored equipment in the response.

19. A method for controlling an electric power delivery system by executing a time coordinated instruction set, comprising:
connecting a plurality of intelligent electronic devices (IEDs) in communication with monitored equipment in an electrical power delivery system via a data network;
a communication master determining a time coordinated instruction set comprising at least one execution action for execution by the monitored equipment;
the communication master establishing an execution time for the time coordinated instruction set;
transmitting the execution time to the at least one of the plurality of IEDs via the data network; and
the at least one of the plurality of IEDs performing the time coordinated instruction set at the execution time for time coordinated execution by the monitored equipment.

20. The method of claim 19, further comprising:
synchronizing the plurality of IEDs to a common time reference.

21. The method of claim 20, wherein synchronizing the plurality of intelligent electronic devices (IED) to a common time reference comprises each IED receiving a common time signal via an IED external time input.

22. The method of claim 19, further comprising:
at least one IED monitoring at least one characteristic of monitored equipment in communication with the electric power delivery system using a sensor.

23. The method of claim 22, further comprising:
evaluating a condition subsequent to the execution time using the at least one characteristic monitored by the sensor; and
communicating a result of the evaluated condition to the communication master.

24. The method of claim 19, further comprising obtaining verification from a user prior to establishing an execution time.

25. The method of claim 19, further comprising:
querying each of the plurality of IEDs identified to perform each execution action of the time coordinated instruction set prior to establishing an execution time to determine readiness of each IED to perform each respective execution action of the time coordinated instruction set; and
receiving confirmation from each IED of readiness to execute each of the execution actions.

26. The method of claim 19, wherein the time coordinated instruction set comprises a plurality of execution actions, and wherein the method further comprises:
identifying which of the plurality of the IEDs is to perform each of the plurality of execution actions; and
transmitting each execution action to the respective IED.

27. The method of claim 19, further comprising:
transmitting the time coordinated instruction set to at least one of the plurality of IEDs via the data network.

* * * * *